United States Patent
Yamakawa (10) Patent No.: US 6,559,998 B2
(45) Date of Patent: May 6, 2003

(54) OPTICAL SCANNING APPARATUS

(76) Inventor: Hiromitsu Yamakawa, c/o Fuji Photo Optical Co., Ltd., 1-324, Uetake, Omiya-City, Saitama, 330-8624 (JP)

( * ) Notice: Subject to any disclaimer, the term of this patent is extended or adjusted under 35 U.S.C. 154(b) by 86 days.

(21) Appl. No.: 09/796,274

(22) Filed: Feb. 28, 2001

(65) Prior Publication Data

US 2001/0021056 A1 Sep. 13, 2001

(30) Foreign Application Priority Data

Mar. 7, 2000 (JP) ........................................ 2000-062434

(51) Int. Cl.⁷ .............................................. G02B 26/08
(52) U.S. Cl. ........................ 359/204; 359/216; 347/241; 347/243; 347/244
(58) Field of Search ................................ 359/204, 205, 359/212–219; 347/233, 241–244

(56) References Cited

U.S. PATENT DOCUMENTS 6,346,957 B1 * 2/2002 Maruyama .................. 347/115

* cited by examiner

*Primary Examiner*—James Phan
(74) *Attorney, Agent, or Firm*—Frommer Lawrence & Haug LLP; Matthew K. Ryan (57) ABSTRACT

Provided is an optical scanning apparatus in which images are formed precisely on the target surface to be scanned with a plurality of beams and low manufacturing cost is realizes. The optical scanning apparatus comprises four light sources, each of which emits a beam, a collimator lens and a polygon mirror. Provided between the polygon mirror and the target surface, cylindrical mirrors to form images with beams on the respective target surfaces. The optical path, from the polygon mirror to the target surface, of the beams emitted from the light sources away from the optical axis of the collimator lens is shorter than the corresponding optical path of the beams emitted from the light sources close to the optical axis. Thus, even though the collimator lens has the curvature of field, all of the image spots formed with the beams are located just on the target surface.

9 Claims, 6 Drawing Sheets

OPTICAL SCANNING APPARATUS

BACKGROUND OF THE INVENTION

1. Field of the Invention

The present invention relates to an optical scanning apparatus which is used, e.g., in a laser beam printer and the like, more particularly, to an optical scanning apparatus which scans a plurality of pencils of light (referred to as a beam herein after) all at once.

2. Description of the Related Art

In an optical scanning apparatus used, e.g., in a laser beam printer, an optical spot is formed by emitting a beam (laser beam and the like) on the surface of a photosensitive material, and the optical spot is shifted (i.e., scanned) on the surface of the photosensitive material and the like, for example. In such an optical scanning apparatus, a beam emitted from a light source such as a semiconductor laser device is converted into a parallel beam through a collimator lens and the parallel beam is reflected onto a target surface to be scanned (i.e., the surface of the photosensitive material and the like) by a deflecting means such as a polygon mirror.

In recent years, an optical scanning apparatus which scans a plurality of beams has been developed. In such an optical scanning apparatus, a plurality of beams is emitted from the respective light sources aligned, and each of the plurality of beams is converted into a parallel beam via a common collimator lens and then reflected onto the target surface by a common deflecting means. All the beams emitted from any light source have the same distance from the light source to the target surface.

In such an optical scanning apparatus, a plurality of beams passes a common collimator lens. When three or more beams are emitted, there exists a beam emitted from a light source near the optical axis of the collimator lens and a beam emitted from a light source away from the optical axis of the collimator lens. Thus, image points formed with these beams are different due to the curvature of field of the collimator lens in general. Specifically, the image point formed with the beam emitted from the light source farther from the optical axis of the collimator lens is located closer to the collimator lens than that formed with the beam emitted from the light source closer to the optical axis. Such variations in the positions of image formation result in variation in size and shape of the optical spot formed on the target surface. Specifically with recent demand for high-resolution, such variations have become a problem of great difficulty.

To solve such a problem, the curvature of field of the collimator lens has to be reduced. However, reduction of the curvature of field requires the collimator lens to be composed of a plurality of lenses, which causes an increase in manufacturing cost.

SUMMARY OF THE INVENTION

The present invention has been achieved in view of the above problems. It is an object of the invention to provide an optical scanning apparatus in which low manufacturing cost is realized as well as images are formed precisely on the target surface with a plurality of beams.

An optical scanning apparatus for scanning a beam on a target surface to be scanned comprises: three or more light sources, each of which emits a beam; a first optical system provided in common with three or more beams emitted from the light sources; deflecting means which deflects the beams passed through the first optical system in a manner that the beams are scanned on the target surface along a scan direction; and a second optical system which forms images on the target surface with the beams deflected by the deflecting means. In the optical scanning apparatus at least one of a first optical path of each beam and a second optical path of each beam is set in accordance with a curvature of field of the first optical system, the first optical path being from each of the light sources to the first optical system and the second optical path being from the deflecting means to the target surface.

In the optical scanning apparatus of the invention, at least one of the first optical path and the second optical path is set in accordance with a curvature of field of the first optical system. Therefore, even though the first optical system has the curvature of field, all of the image points formed with the beams are located just on the target surface.

Preferably, the first optical system includes a collimator for converting each of the beams into a parallel beam in substance, and at least one of the first optical path and the second optical path is set in accordance with a curvature of field of the collimator. Preferably the first optical system further includes a convergent optical system which converges each of the beams, converted into the parallel beam in substance by the collimator, only in a direction corresponding to a direction orthogonal to the scan direction on the target surface, so that each of the beams is focused in the vicinity of the deflecting means.

Preferably, the larger a distance between a light source and an optical axis of the first optical system is, the shorter at least one of the first optical path and the second optical path of the beams emitted from the light source is. Further, the optical path along each beam from the deflecting means to the target surface may be changed by means of changing a configuration of the second optical system. Alternatively, the optical path along each beam from the deflecting means to the target surface may be changed by means of adjusting a position of the target surface. Preferably, the second optical system has a common part through which all of the beams deflected by the deflecting means pass, the common part having a converging ability only in the scan direction. Preferably, the second optical system has a common part through which all of the beams deflected by the deflecting means pass, and center axes of the beams which pass through the common part are parallel to each other.

Other and further objects, features and advantages of the invention will appear more fully from the following description.

DETAILED DESCRIPTION OF THE PREFERRED EMBODIMENTS

Embodiments of the present invention will be described in detail below with reference to accompanying drawings.

[First Embodiment]

[Structure of an Optical Scanning Apparatus]

Figure 1:
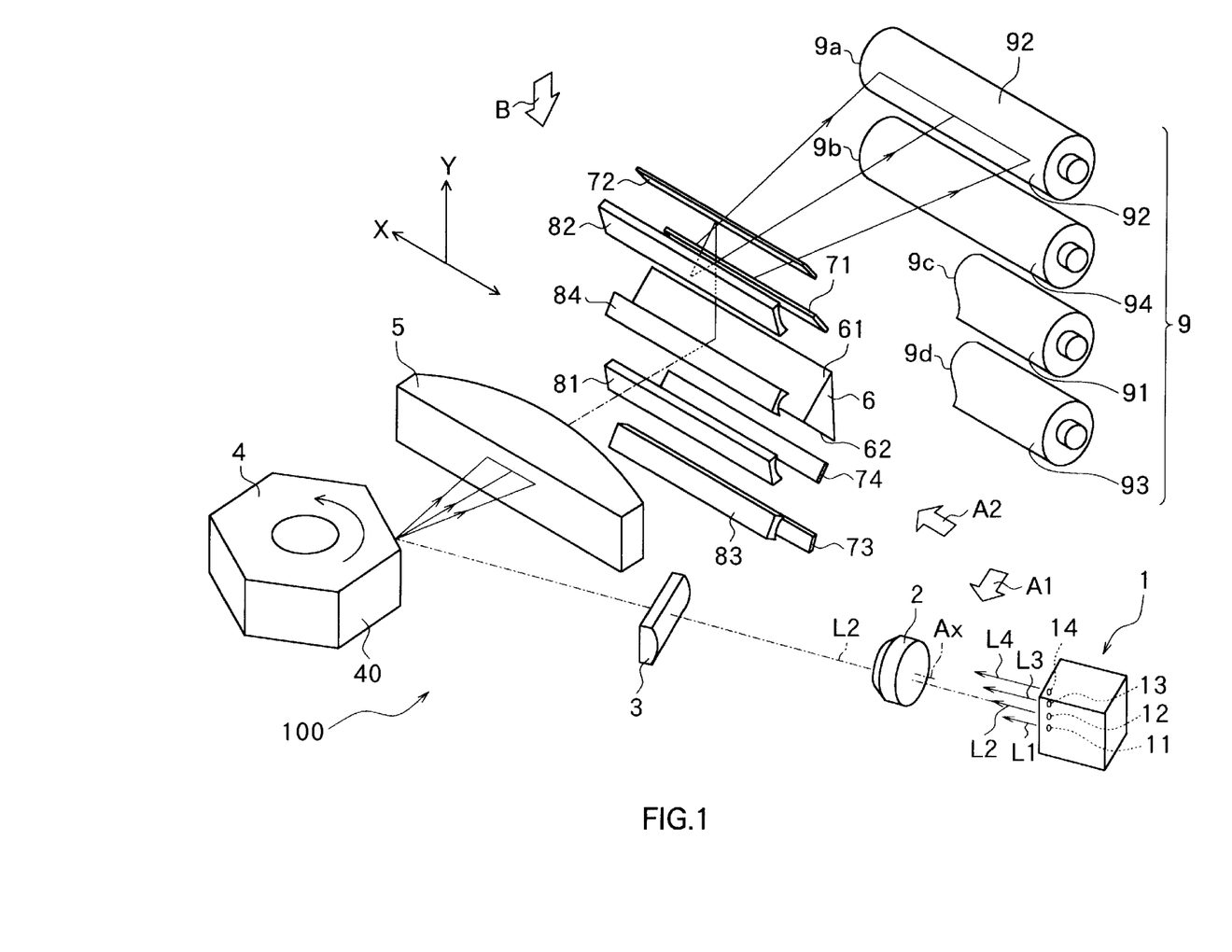
FIG. 1 is a schematic perspective view of the structure of an optical scanning apparatus according to a first embodiment of the present invention.

FIG. 1 is a schematic perspective view of the structure of an optical scanning apparatus according to a first embodiment of the present invention. An optical scanning apparatus 100 illustrated in FIG. 1 is used in a color laser printer, for example. In the optical scanning apparatus 100, optical spots are formed by emitting four beams onto the surface of a photosensitive material, and the optical spots are shifted (i.e., scanned) along the surface of the photosensitive material in a predetermined direction. In the following description, the direction along which the optical spot is shifted is designated as a main-scan direction (indicated by the arrow X in the drawing) and the direction orthogonal to the main-scan direction designated as a sub-scan direction (indicated by the arrow Y in the drawing). In the description, the surface of the photosensitive material (described later) on which the optical spots are to be formed is referred to a surface 9 to be scanned.

In a light emitting unit 1 of the optical scanning apparatus 100, four light sources 11, 12, 13 and 14 are aligned in this order in the sub-scan direction at intervals of, e.g., 0.08 mm. These light sources 11 to 14 are constituted of a semiconductor laser device or the like and emit beams with wavelength of 780 $\mu$m, for example. The light sources 11 to 14 are independently controlled by a controlling unit (not shown), and on/off operation is performed at high speed (e.g., several MHz to several tens of MHz). Here, the light sources 11 to 14 correspond to a specific example of "three or more light sources" of the invention.

A collimator lens 2 is arranged on the emission side of the light sources 11 to 14. The collimator lens 2 is rotatably symmetrical with respect to an optical axis Ax and converts diverging four beams L1 to L4 into parallel beams, the beams being emitted from the four light sources 11 to 14 in the emitting unit 1, respectively. The collimator lens 2 is constituted of one lens having an aspheric surface and its focal length fc is, e.g., 5 mm. The extension of the optical axis Ax of the collimator lens 2 passes through the midpoint between the two inner light sources 12 and 13. More specifically, the beams L1 and L2 emitted from the light sources 11 and 12, and the beams L4 and L3 emitted from the light sources 14 and 13 are symmetrical with respect to the optical axis Ax of the collimator lens 2.

A cylindrical lens 3 is provided on the emission side (i.e., the opposite side to the light sources 11 to 14) of the collimator lens 2. The cylindrical lens 3 has power only in the sub-scan direction and forms images at the vicinity of a specular surface 40 of a polygon mirror 4 in the sub-scan direction with the four beams L1 to L4 which having passed through the collimator lens 2 are converted into parallel beams. The focal length fy of the cylindrical lens 3 is, for example, 200 mm.

The polygon mirror 4 is provided on the emission side (i.e., the opposite side to the collimator lens 2) of the cylindrical lens 3. The polygon mirror 4 is a six-face mirror in which six faces of a hexagonal column are specular surfaces 40 and rotatably driven at a speed of, e.g., 5000 to 20000 rotation/minute by a motor (not shown). The polygon mirror 4 changes reflection angles of the beams L1 to L4 at the specular surface 40 by alternating the speed of rotation, whereby the beams are scanned in the main-scan direction. Here, the polygon mirror 4 corresponds to a specific example of "deflecting means" and "rotary polygon mirror" of the present invention.

An fθ lens 5 is provided on the emission side of the polygon mirror 4 (i.e. the direction of travel of the beam reflected by the specular surface 40). The fθ lens 5 has power (converging ability) in the main-scan direction and makes the optical spot shift on the surface 9 to be scanned at a constant line speed irrespective of the rotation angle of the polygon mirror 4.

Figure 2:
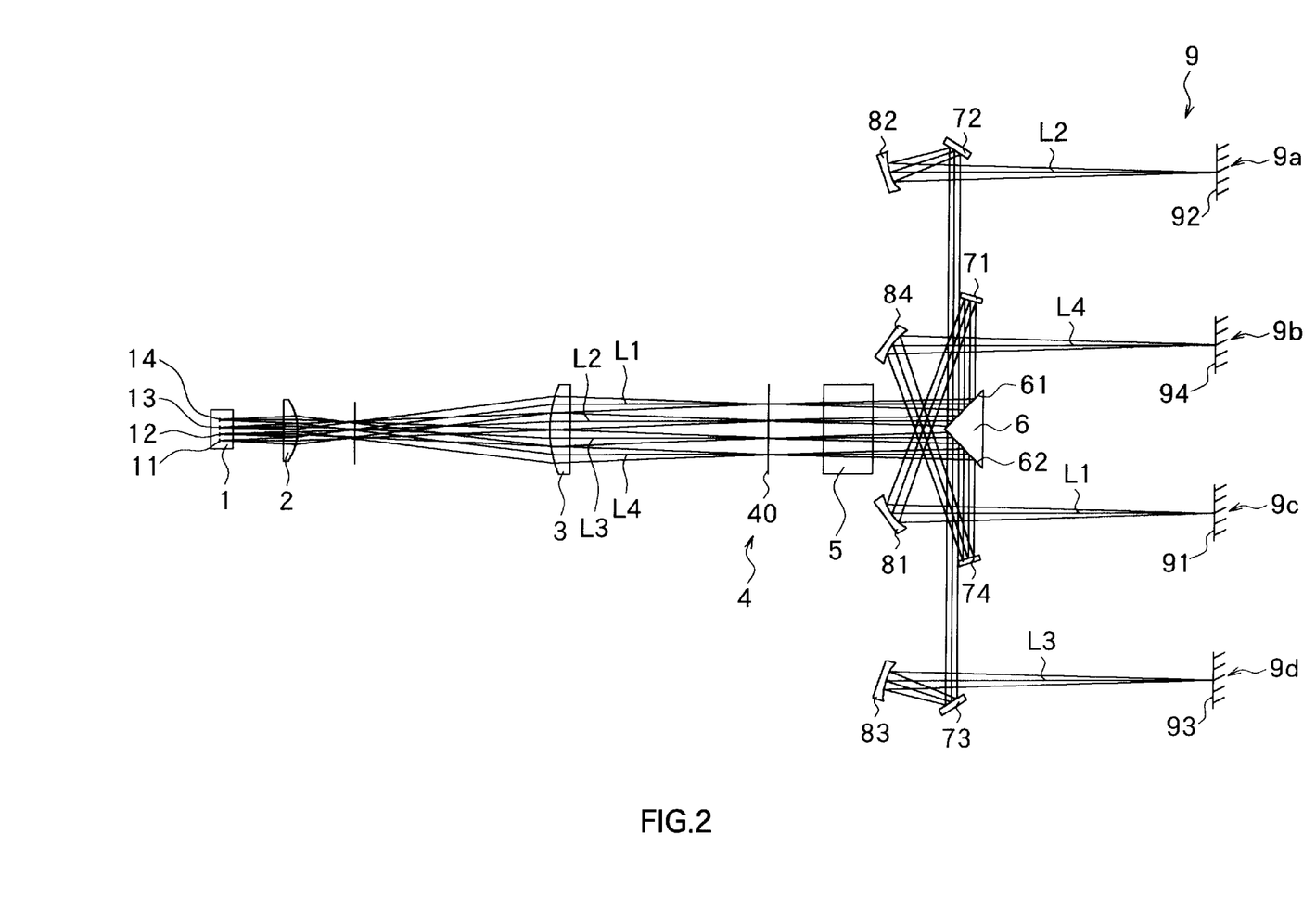
FIG. 2 is a side view of the optical scanning apparatus as in FIG. 1, when it is viewed from the directions indicated by the arrows A1 and A2 of FIG. 1.
Figure 3:
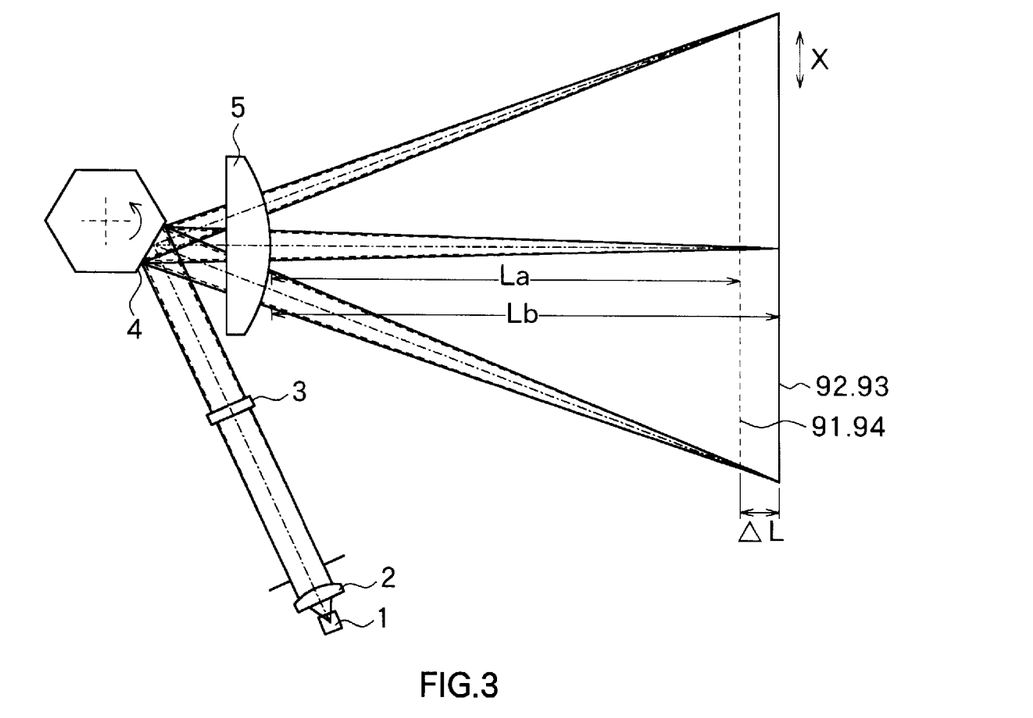
FIG. 3 is a plan view of the optical scanning apparatus as in FIG. 1, when it is viewed from the direction indicated by the arrow B as in FIG. 1.

FIG. 2 is a side view of the optical scanning apparatus 100 when it is viewed from the directions indicated by the arrows A1 and A2 in FIG. 1. FIG. 3 is a plan view of the optical scanning apparatus 100 when it is viewed from the direction indicated by the arrow B in FIG. 1. In the FIG. 2, the specular surface 40 of the polygon mirror 4 is illustrated in a line. A splitting mirror 6, plate mirrors 71 to 74 and cylindrical mirrors 81 to 84 to be described later are not illustrated in FIG. 3.

Figure 4:
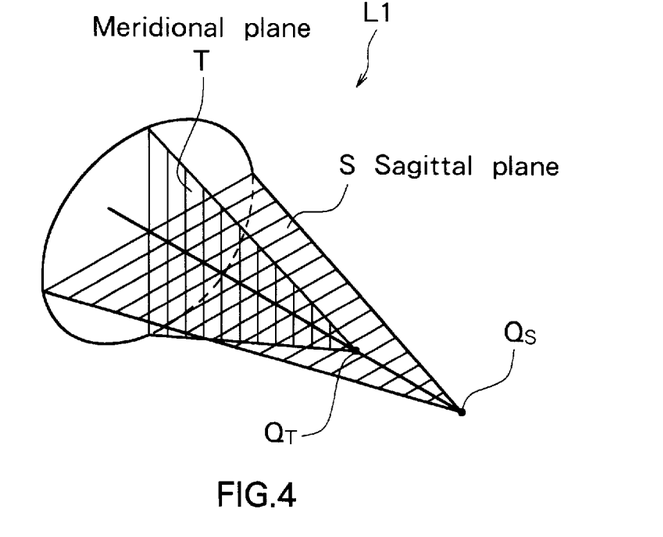
FIG. 4 is a diagram showing a stage of image formation with a beam.

An image formation position $Q_S$ is formed with rays (preferred to as sagittal rays herein later) included on a sagittal plane (S plane) of the beam L1, the sagittal plane extending in the main-scan direction, while an image formation position $Q_T$ is formed with rays (referred to as meridional rays herein after) included on a meridional plane or tangential plane (T plane) of the beam L1, the meridional plane extending in a direction orthogonal to the main-scan direction. As schematically shown in FIG. 4, the image formation position $Q_S$ does not correspond to the image formation position $Q_T$. Similarly, with regard to other beams L2 to L4, the image formation position $Q_S$ does not correspond to the image formation position $Q_T$. FIG. 3 shows a state of image formation with the sagittal rays, whereas FIG. 2 shows a state of image formation with the meridional rays.

As shown in FIG. 2, the beams L1 to L4 reflected by the polygon mirror 4 pass through the fθ lens 5 in a manner that centers of the beams L1 to L4 are parallel to each other. Thus, the fθ lens 5 evenly acts on the beams L1 to L4. The beams L1, L2, L3 and L4 pass through the fθ lens 5 in this order from the top in the drawing. The fθ lens 5 corresponds to a specific example of "a part through which the beams deflected by the deflecting means commonly pass in the second optical system" of the present invention. Each of the collimator lens 2 and the cylindrical lens 3 correspond to a specific example of "first optical system" of the present invention. The cylindrical lens 3 corresponds to a specific example of "convergent optical system" of the present invention.

The splitting mirror 6 is provided on the emission side (i.e., the opposite side to the polygon mirror 4) of the fθ lens 5. The splitting mirror 6 is a triangular column having a right triangle cross section, for example, and two surfaces thereof orthogonal to each other are a first mirror surface 61 and a second mirror surface 62. The splitting mirror 6 and the fθ lens 5 are parallel to each other in the longitudinal direction thereof. The first mirror surface 61 and the second mirror surface 62 are arranged so as to face the fθ lens 5. The first mirror surface 61 and second mirror surface 62 of the splitting mirror 6 are inclined 45 degrees to the direction of travel of the beams L1 to L4 passed through the fθ lens 5, for example.

The first mirror surface 61 of the splitting mirror 6 reflects the beam L1 near the surface 9 to be scanned and reflects the beam L2 near the fθ lens 5. The second mirror surface 62 reflects the beam L4 near the surface 9 to be scanned and reflects the beam L3 near the fθ lens 5. Both directions of reflection of the first mirror surface 61 and the second mirror surface 62 are the sub-scan direction but opposite to each other. In the following description, the expression 'above' denotes the side where the beams L1 and L2 pass through and 'below' denotes the side where the beams L3 and L4 pass through.

The plate mirrors 71 and 72 and the cylindrical mirrors 82 and 84 are provided above the splitting mirror 6. The plate mirrors 73 and 74 and the cylindrical mirrors 81 and 83 are provided below the splitting mirror 6. These plate mirrors 71, 72, 73 and 74 and cylindrical mirrors 81, 82, 83 and 84 guide the four beams L1 to L4 to the surface 9 to be scanned via each different optical path. The cylindrical mirrors 81 to 84 are concave mirrors having power in the sub-scan direction and form images on the surface 9 to be scanned with the beams L1 to L4. By the action of the cylindrical mirrors 81 to 84, the specular surface 40 of the polygon mirror 4 and the surface 9 to be scanned have a quasi-conjugable relationship. That is, even though the specular surface 40 of the polygon mirror 4 inclined due to manufacturing error, the position of an optical spot on the surface 9 to be scanned in the sub-scan direction is not influenced. These plate mirrors 71 to 74 and cylindrical mirrors 81 to 84 will be described below step by step with reference to FIG. 2.

The first plate mirror 71 is placed above the first mirror surface 61 of the splitting mirror 6, on the side close to the surface 9 to be scanned (on the right side in the drawing). The second plate mirror 72 is placed further above the first plate mirror 71, on the side close to the fθ lens 5 (on the left side in the drawing). Specifically, the beam L1 reflected by the first mirror surface 61 comes onto the first plate mirror 71 and the beam L2 reflected by the first mirror surface 61 comes onto the second plate mirror 72. The angle of the first plate mirror 71 is set in a manner that the beam L1 reflected by the first mirror surface 61 is deflected, e.g., about 20 degrees to the side close to the fθ lens 5. The angle of the second plate mirror 72 is set in a manner that the beam L2 reflected by the first mirror surface 61 is deflected, e.g., about 60 degrees to the side close to the fθ lens 5.

The first cylindrical mirror 81 is provided in the direction of travel of the beam L1 reflected by the first plate mirror 71 and the second cylindrical mirror 82 is provided in the direction of travel of the beam L2 reflected by the second plate mirror 72. The second cylindrical mirror 82 is provided relatively near the second plate mirror 72, while the first cylindrical mirror 81 is provided on the opposite side to the first plate mirror 71 with respect to the splitting mirror 6. The first cylindrical mirror 81 and the second cylindrical mirror 82 reflect the parallel beams L1 and L2 toward the surface 9 to be scanned, respectively.

The third plate mirror 73 and the fourth plate mirror 74 are placed below the second mirror surface 62 of the splitting mirror 6. The third plate mirror 73 and the fourth plate mirror 74 are disposed symmetrical to the second plate mirror 72 and the first plate mirror 71, respectively, with respect to the splitting mirror 6. The third cylindrical mirror 83 and the fourth cylindrical mirror 84 are provided in the direction of travel of the beams L3 and L4 reflected by the third plate mirror 73 and the fourth plate mirror 74, respectively. These third cylindrical mirror 83 and fourth cylindrical mirror 84 are provided symmetrical to the second cylindrical mirror 82 and the first cylindrical mirror 81, respectively, with respect to the splitting mirror 81. The third cylindrical mirror 83 and the fourth cylindrical mirror 84 reflect the beams L3 and L4 toward the surface 9 to be scanned, respectively in a way that the beams L3 and L4 are parallel to each other. The beams L3 and L4 which travel from the third cylindrical mirror 83 and the fourth cylindrical mirror 84 to the surface 9 to be scanned are parallel to the beams L1 and L2 which travel from the first cylindrical mirror 81 and the second cylindrical mirror 82 to the surface to be scanned. Here, each of the fθ lens 5, the splitting mirror 6, the plate mirrors 71 to 74 and the cylindrical mirrors 81 to 84 corresponds to a specific example of "second optical system" of the present invention.

Thus constituted the splitting mirror 6, the plate mirrors 71 to 74 and the cylindrical mirrors 81 to 84 change the order of the beams L1 to L4. That is, the beams L1, L2, L3 and L4 come onto the splitting mirror 6 in this order from the top, but the order of the beams is changed to L2, L4, L1 and L3 when the beams travel from the cylindrical mirrors 81 to 84 to the surface 9. Magnification $\beta_0$ of the optical system from the polygon mirror 4 to the surface 9 to be scanned in the sub-scan direction is largely determined by the curvature of the specular surface (concave) of the cylindrical mirrors 81 to 84. The magnification $\beta_0$ is $-0.55$-fold, for example.

A photosensitive material made of, e.g., selenium is applied on the surface of four photoconductor drums 9a to 9d disposed parallel to each other and the surface is used as the surface 9 to be scanned. In the following description, a surface of the photoconductor drum 9a is called a surface 92 to be scanned because the beam L2 comes thereon and a surface of the photoconductor drum 9b is called a surface 94 to be scanned since the beam L4 comes thereon. Similarly, a surface of the photoconductor drum 9c is called a surface 91 to be scanned since the beam L1 comes thereon and a surface of the photoconductor drum 9d is called a surface 93 to be scanned because the beam L3 comes thereon.

Figure 5:
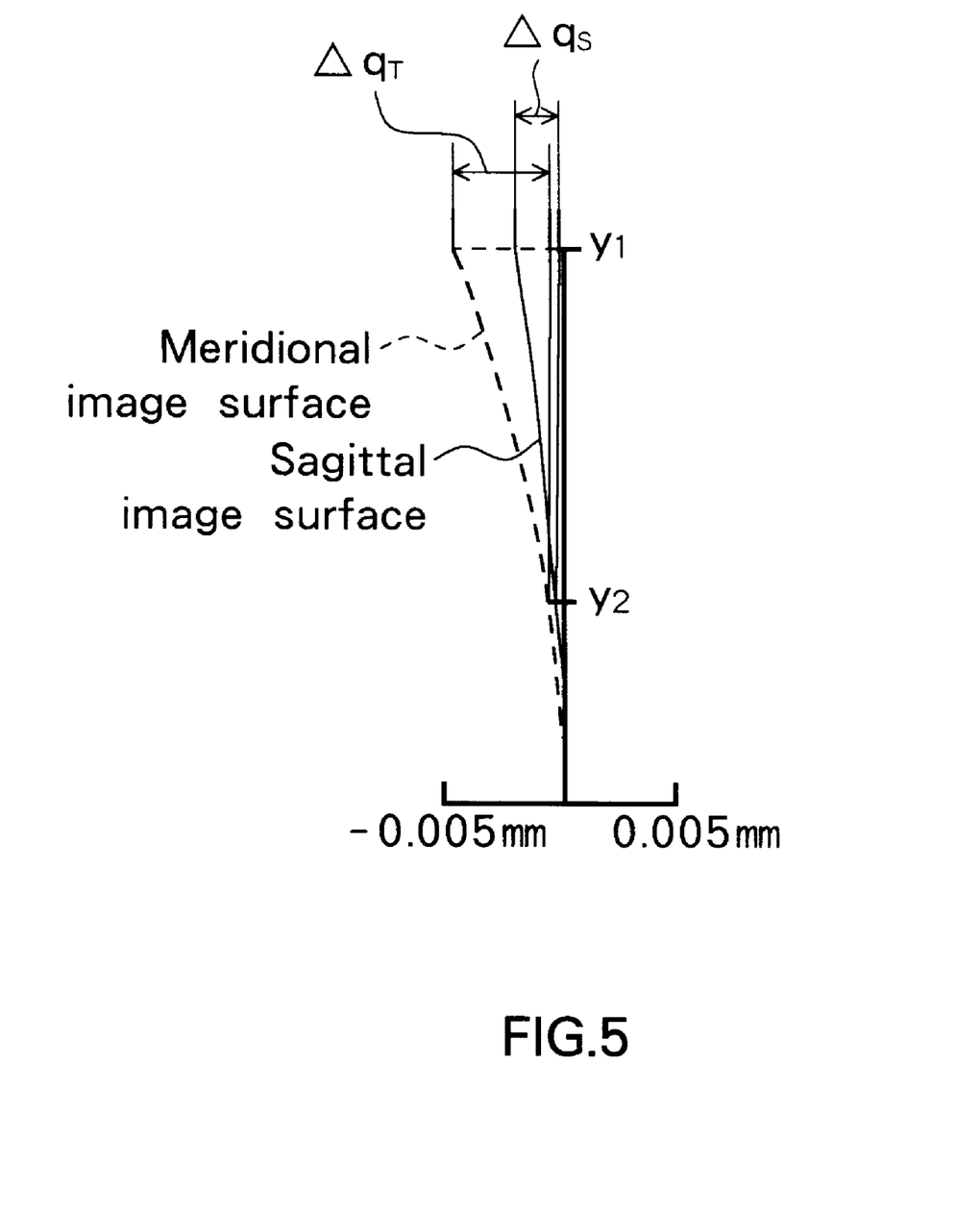
FIG. 5 is a diagram explaining the curvature of field of a collimator lens.

With reference to FIG. 3, the configuration realizing that the positions of image formations with the beams L1 to L4 precisely correspond to the respective surfaces 91 to 94 to be scanned, will be described below. In the embodiment, as shown in FIG. 1 when the beams L1 to L4 enter the collimator lens 2, the inner beams L2 and L3 enter the collimator lens 2 in a position close to the optical axis Ax and the outer beams L1 and L4 enter the collimator lens 2 in a position far off the optical axis Ax. In this case, if the collimator lens 2 has the curvature of field, e.g., as shown in FIG. 5 (to be described later), the image points formed with the beams L1 and L4 which enter the collimator lens 2 in the position farther from the optical axis Ax of the collimator lens 2 are located closer to the collimator lens 2 than those formed with the beams L2 and L3 which enter the collimator lens 2 in the position closer to the optical axis Ax of collimator lens 2. Thus, if all the optical paths, from the specular surface 40 of the polygon mirror 4 to the surface 91 to 94 to be scanned, of the beams L1 to L4 are the same, it is difficult to form all images with the beams L1 to L4 right on the surfaces 91 to 94 to be scanned. The positions of image formation with the beams L1 and L4 are the same, the beams L1 and L4 being symmetrical to each other with respect to the optical axis Ax of the collimator lens 2 while the positions of image formation with the beams L2 and L3 are the same, the beams L2 and L3 being symmetrical to each other with respect to the optical axis Ax.

In the embodiment, as shown in FIG. 3 a second optical path (optical path La), from the specular surface 40 to the surfaces 91 and 94 to be scanned, of the beams L1 and L4 is made shorter than a second optical path (optical path Lb), from the specular surface 40 to the surfaces 92 and 93 to be scanned, of the beams L2 and L3. That is, the optical path, from the specular surface 40 to the surface to be scanned, of the beams L1 and L4 is made shorter than that of the beams L2 and L3, the beams L1 and L4 being emitted from the light source far away from the optical path Ax of the collimator lens 2 (i.e. the beam with which the position of image formation is deviated to the side close to the collimator lens 2 due to the curvature of field of the collimator lens 2). Thus, even if the collimator lens 2 has the curvature of field, the positions of image formation with the beams L1 to L4 correspond to the surface 91 to 94 to be scanned, respectively. Variation in sizes and shapes of the optical spots formed on the surface 91 to 94 to be scanned is prevented.

The difference between the optical paths La and Lb (referred to as an optical path difference ΔL herein after) is adjusted by adjusting the position of the surfaces 91 to 94 to be scanned (i.e., the position of photoconductor drums 9a to 9d) in a direction along the optical axis of the incident ray. In this case, as indicated by the broken line in FIG. 3, the surfaces 91 to 94 to be scanned are adjusted so as to be close to the fθ lens 5 than the surfaces 92 and 93 to be scanned. The optical path difference ΔL may be adjusted by adjusting the position of the plate mirrors 71 to 74 or the position of the cylindrical mirrors 81 to 84. The position of image formation with each beam in the sub-scan direction may be adjusted by adjusting the radius of curvature of the cylindrical mirrors 81 to 84 and the position thereof.

Determination of the optical path difference ΔL between the optical path La and the optical path Lb will be described below. FIG. 5 shows an example of the curvature of field of the collimator lens 2. In the FIG. 5, the vertical axis denotes image height while the horizontal axis denotes the position of the collimator lens 2 in the direction along the optical axis. The left side of the horizontal axis corresponds to the side close to the collimator lens 2. 'y1' represents the image height corresponding to the beams L1 and L4, and 'y2' represents the image height corresponding to the beams L2 and L3. The difference $\Delta q_S$ in the direction along the optical axis between an image point formed with sagittal rays at the image height y1 and an image point formed with sagittal rays at the image height y2 (i.e., the difference in the sagittal field tilt at the image height y1 and at the image height y2) is 0.002 mm.

The optical length difference ΔL is obtained by multiplying the difference $\Delta q_S$ in the sagittal field tilt by the vertical magnification $\alpha_S$ of the optical system from the light source 11 to 14 to the surfaces 91 to 94 to be scanned in the main-scan direction. The vertical magnification is a square of the magnification of image formation (horizontal magnification). Therefore, when $\beta_S$ is the magnification of the image formation of the optical system from the light sources 11 to 14 to the surfaces 91 to 94 to be scanned (with regard to the sagittal ray) in the main-scan direction, the optical path difference ΔL is obtained by the following numerical formula (1).

$$\Delta L = \alpha_S \times \Delta q_S = \beta_S^2 \times \Delta q_S \quad (1)$$

When 'fc' denotes the focal length of the collimator lens 2 and '$f_F$' denotes the focal length of the fθ 5, the magnification $\beta_S$ of the sagittal ray of the optical system from the light sources 11 to 14 to the surfaces 91 to 94 to be scanned is obtained by the following numeral formula (2).

$$-\beta_S f_F / f_C \quad (2)$$

In the above numerical formulas (1) and (2), assuming that $f_C$ is 5 mm; $f_F$ is 250 mm; and the difference $\Delta q_S$ in the sagittal field tilt in the direction along the optical axis is 0.002 mm, the ΔL is 5 mm. Thus, when the optical path La from the specular surface 40 to the surface to be scanned of the beams L1 and L4 is made 5 mm shorter than the optical path Lb from the specular surface 40 to the surface to be scanned of the beams L2 and L3, most preferable image formation is realized with all beams L1 to L4 on the surfaces 91 to 94 to be scanned.

To realize preferable image formation with all meridional rays, the optical path difference $\Delta L_T$ between the optical path La and the optical path Lb is obtained in the following manner. As shown in FIG. 5, the difference $\Delta q_T$ between positions of image formation with the meridional rays at the image height y1 and at the image height y2 in the direction along the optical axis (i.e., the difference in the meridional field tilt) is 0.0044 mm. The optical path difference $\Delta L_T$ is obtained by multiplying the difference $\Delta q_T$ in the meridional field tilt by the vertical magnification $\alpha_T$ of the optical system from the light source 11 to 14 to the surfaces 91 to 94 to be scanned in the sub-scan direction. The vertical magnification is a square of the magnification of image formation (horizontal magnification). When $\beta_T$ is the magnification of image formation (with respect to the meridional ray) of the optical system from the light sources 11 to 14 to the surfaces 91 to 94 to be scanned in the sub-scan direction, the optical path difference $\Delta L_T$ is obtained by the following numerical formula (3).

$$\Delta L_T = \alpha_T \times \Delta q_T = \beta_T^2 \times \Delta q_T \quad (3)$$

When 'fc' is the focal length of the collimator lens 2, 'fy' is the focal length of the cylindrical lens 3 and '$\beta_P$' is the magnification of the meridional ray of the optical system from the polygon mirror 4 to the surfaces 91 to 94 to be scanned, the magnification $\beta_T$ of the meridional ray of the optical system from the light sources 11 to 14 to the surfaces 91 to 94 to be scanned is obtained by the following numerical formula (4).

$$-\beta_T = (fy/fc) \times \beta_P \quad (4)$$

In the above numerical formulas (3) and (4), on the assumption that $f_C$ is 5 mm; fy is 200 mm; $\beta_P$ is −0.55-fold; and the difference $\Delta q_T$ in the meridional field tilt in the direction along the optical axis is 0.0044 mm, $\Delta L_T$ is 2.2 mm. Accordingly, the optical path La, from the specular surface 40 to the surface to be scanned, of the beams L1 and L4 is made 2.2 mm shorter than the optical path Lb, from the specular surface 40 to the surface to be scanned, of the beams L2 and L3, whereby most preferable image formation is realized with all beams L1 to L4 on the surfaces 91 to 94 to be scanned.

In the embodiment, the optical path La, from the specular surface 40 to the surface to be scanned, of the beams L1 and L4 is made 5 mm shorter than the optical path Lb, from specular surface 40 to the surface to be scanned, of the beams L2 and L3 (that is, the optical path difference ΔL is 5 mm). Thus, too much correction is made for the meridional ray. However, the radius of curvature of the cylindrical mirrors 81 to 84 or the position thereof in the sub-scan direction is appropriately set, whereby the four beams are preferably converged on the surface to be scanned.

Here, the preferable range of the optical path difference ΔL will be described. If the optical path difference ΔL is too large, too much correction is made. Thus, the size of the optical spot on the surface to be scanned becomes larger, which makes favorable printing difficult. Hence, preferably the optical path difference ΔL lies within the range expressed in the following numerical formula (5). $\Delta q_S$ and $\beta_S$ in the numerical formula (5) denote the same as those used in the numerical formula (1).

$$0 < \Delta L < 1.2 \times \Delta q_S \times \beta_s^2 \quad (5)$$

Figure 6:
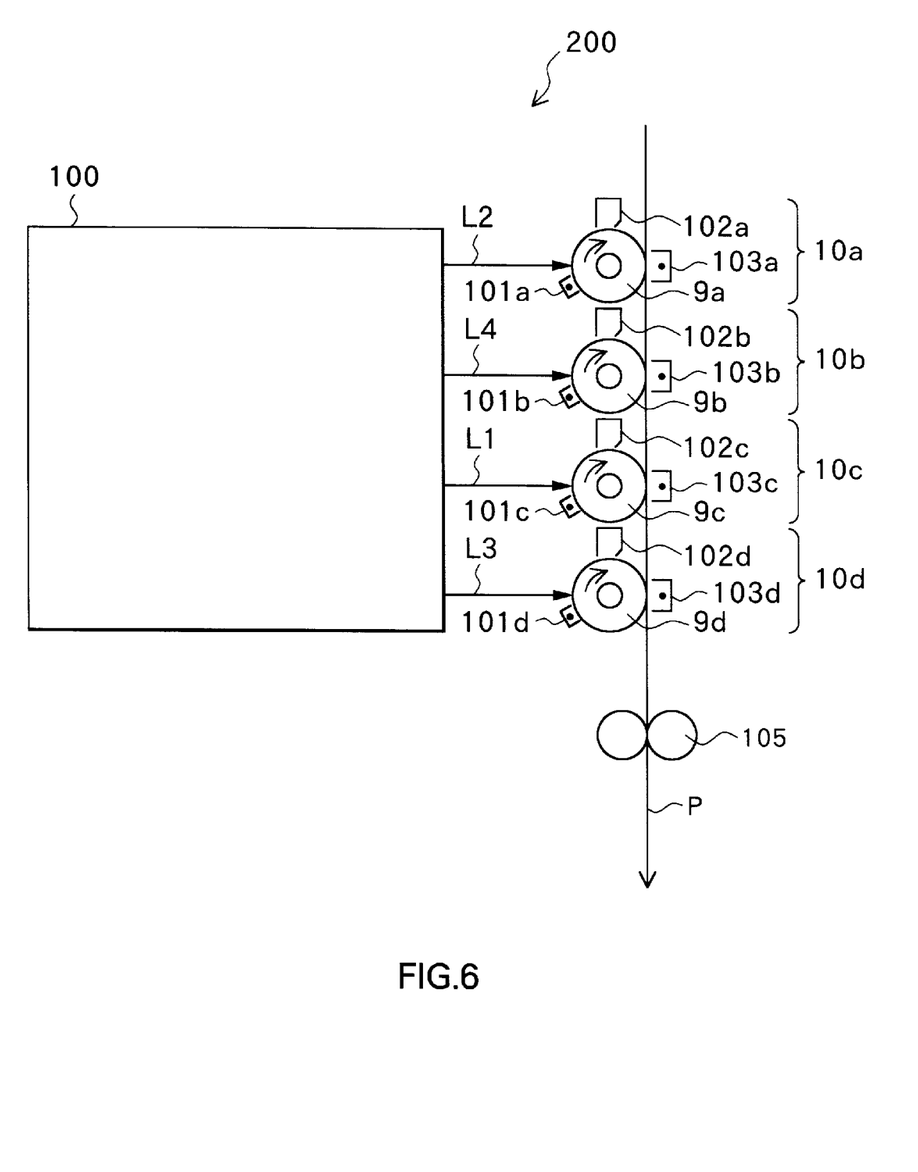
FIG. 6 is a diagram showing an example of a color laser printer in which the optical scanning apparatus of FIG. 1 is incorporated.

FIG. 6 shows an example of a basic configuration of a laser printer 200 in which the optical scanning apparatus of the embodiment is employed. The laser printer 200 utilizes a so-called electrophotography method and has four image formation units 10a, 10b, 10c and 10d, each having photoconductor drums 9a, 9b, 9c and 9d for forming an image of red, blue, green and black, for example. Around the photoconductor drum 9a, the image formation unit 10a has an electrification device 101a for uniformly electrifying the surface of the photoconductor drum 9a, a developing unit 102a including a toner cartridge containing toner and a transfer charger 103a for transferring toner adhering to the photoconductor drum to a paper (indicated by 'P' in the drawing). Similarly, around the photoconductor drums 9b to 9d of the image formation units 10b to 10d, electrification device 101b to 101d, developing units 102b to 102d and transfer chargers 103b to 103d are provided, respectively.

An example of the paper P is A4 size copying paper and the paper P is fed by a feeding mechanism (not shown) along the image formation units 10a to 10d. A fixing roller 105 for fixing a toner image to the paper P, the toner image being transferred onto the paper P is provided downstream of the image formation units 10a to 10d in the feeding direction of the paper P. The light sources 11 to 14 (FIG. 2) of the optical scanning apparatus 100 are controlled in accordance with the travel of the paper P along the image formation units 10a to 10d, which is not described in detail here.

[Operation of the Optical Scanning Apparatus]

The optical scanning apparatus 100 and laser printer 200 composed as described above operate in the following manner. On the instruction of initiation of image formation from an external device such as a computer, the polygon mirror 4 starts to rotate. Subsequently, the photoconductor drums 9a to 9d starts to rotate. On the basis of the image information of red, blue, green and black, the light sources 11 to 14 (FIG. 2) are driven to emit the beams L1 to L4. The beams L1 to L4 emitted from the respective light sources 11 to 14 are diverging rays but pass the collimator lens 2 to assume substantial parallel beams. With the substantial parallel beams L1 to L4, an image is formed in the vicinity of the specular surface 40 of the polygon mirror 4 (the cross section of the beam assumes a straight line extending along the main-scan direction) by the power of the cylindrical lens 3 in the sub-scan direction.

The top beam L1 among the beams L1 to L4 reflected by the polygon mirror 4 is reflected by the first mirror surface 61 of the splitting mirror 6, the first plate mirror 71 and the first cylindrical mirror 81 in this order and an image is formed on the surface 91 to be scanned, the third from the top (i.e., the surface of the photoconductor drum 9c). Similarly, the second beam L2 from the top is reflected by the first mirror surface 61 of the splitting mirror 6, the second plate mirror 72 and the second cylindrical mirror 82 in this order and an image is formed on the top surface 92 to be scanned (the surface of the photoconductor drum 9a). The third beam L3 from the top is reflected by the second mirror surface 62 of the splitting mirror 6, the third plate mirror 73 and the third cylindrical mirror 83 in this order and an image is formed on the lowest surface 93 to be scanned (the surface of the photoconductor drum 9d). The lowest beam L4 is reflected by the second mirror surface 62 of the splitting mirror 6, the fourth plate mirror 74 and the fourth cylindrical mirror 84 in this order and an image is formed on the surface 94 to be scanned, the second from the top (the surface of the photoconductor drum 9b).

The surfaces of the photoconductor drums 9a to 9d are exposed and latent electrostatic images based on the image formation of each color are formed. In that time, even though the collimator lens 2 has the curvature of field as described above, the positions of image formation with the beams L1 to L4 correspond to the surfaces 91 to 94 to be scanned, respectively, by making the optical path La, from the specular surface 40 to the surface to be scanned, of the beams L1 and L4 shorter than the optical path Lb, from the specular surface 40 to the surface to be scanned, of the beams L2 and L 3. Hence, the size and shape of the optical spots formed on the surface of the photoconductor drums 9a to 9d become uniform.

Toner for each color charged opposite electricity to that of the latent electrostatic image adheres to the part where the latent electrostatic images are formed on the photoconductor drums 9a to 9d in the developing units 102a to 102d of the image formation units 10a to 10d and then the toner images are developed. The toner for each color adhering to the photoconductor drums 9a to 9d is transferred on the paper P by the transfer chargers 103a to 103d. As the paper P passes the image formation units 10a to 10d consecutively, the toner images of red, blue, and black are transferred consecutively on the paper P and put together. The toner image of each color transferred on the paper P is fixed on the paper P by heating and pressing by the fixing roller 105. Thus, color image is obtained.

Figure 7:
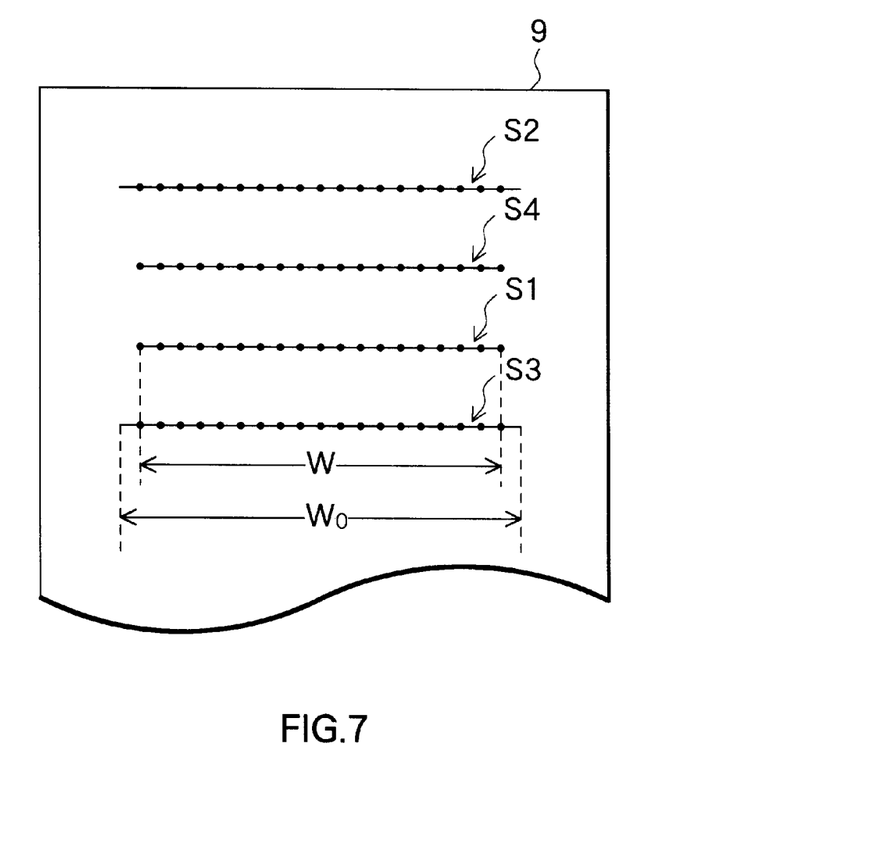
FIG. 7 is a diagram for explaining a method of correcting the length of a scan line.

FIG. 7 is a diagram showing an example of scan lines formed on the surface to be scanned by the beams L1 to L4. In the embodiment, since the optical path La, from the specular surface 40 to the surface to be scanned, of the beams L1 and L4 is made shorter than the optical path Lb, from the specular surface 40 of the beams L2 and L3 to the surface to be scanned, a length W of scan lines S1 and S4 which are formed on the surface to be scanned by the beams L1 and L4 is shorter than a length $W_0$ of scan lines S2 and S3 which are formed by the beams L2 and L3, respectively as shown in FIG. 7. When this is the case, light-emission from the light sources 11 and 14 starts slightly earlier than that from the light sources 12 and 13, and intervals between light-emission from the light sources 11 and 14 is made longer than those from the light sources 12 and 13. Thus, the scan lines S1 to S4 have the same length.

[Effects of the First Embodiment]

As described above, in the embodiment the optical path La, from the specular surface 40 to the surface 9 to be scanned, of the beams L1 and L4 emitted from the light sources 11 and 14 which are away form the optical axis Ax of the collimator lens 2 is made shorter than the optical path Lb, from the specular surface 40 to the surface 9 to be scanned, of the beams L2 and L3 which are emitted from the light sources 12 and 13 close to the optical axis Ax of the collimator lens 2. Specifically, the more the position of image formation deviates frontward (i.e., close to the collimator lens 2) due to the curvature of field of the collimator lens 2, the shorter optical path from the light source to the surface 9 to be scanned the beam has. Accordingly, even though the collimator lens 2 has the curvature of field, the positions of image formation with beams L1 to L4 correspond to the surfaces 91 to 94 to be scanned. Thus, variation in size and shape of the optical spot on the surface to be scanned is prevented.

The fθ lens 5 through which all of the beams L1 to L4 pass has power in the main-scan direction but not in the sub-scan direction, whereby variation in sizes and shapes of the optical spots which are formed on the surfaces 91 to 94 to be scanned due to the influence of the curvature of field of the fθ lens 5 can be prevented. Further, a plurality of beams passes through the fθ lens 5 in a manner that centers of the plurality of beams are largely parallel to each other. Thus, the fθ lens 5 acts evenly on the beams L1 to L4, which realizes uniform scanning.

[Second Embodiment]

A second embodiment of the present invention will be described. In the second embodiment, the beams L1 to L4 have the same optical path from the specular surface 40 of the polygon mirror 4 to the surfaces 91 to 94 to be scanned but the light sources 11 to 14 are differently constituted from those of the first embodiment. Other structures of the second embodiment are the same as those of the first embodiment.

Figure 8:
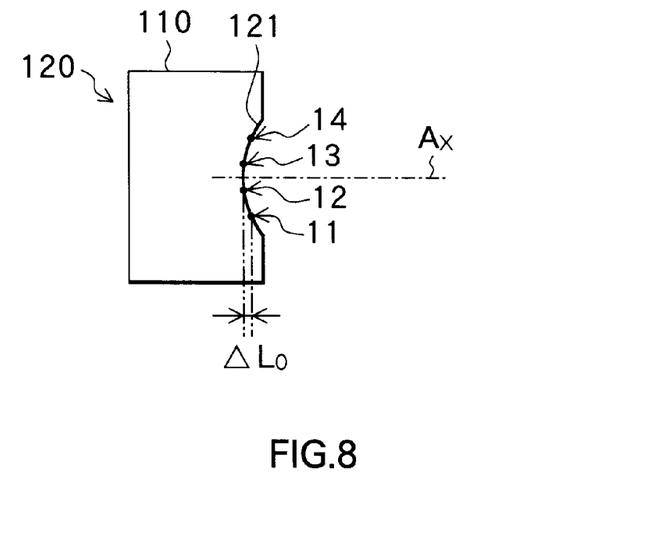
FIG. 8 is a side view of the structure of an emitting unit in the optical scanning apparatus of a second embodiment of the invention.

FIG. 8 is a side view of an emitting unite 110 of an optical scanning apparatus of the second embodiment. In the emitting unit 110 of the optical scanning apparatus of the embodiment, first optical paths of beams L1 and L4 that are emitted from the light sources 11 and 14 disposed away from the optical axis Ax of the collimator lens 2, i.e., the distance from the light sources 14 and 11 to the collimator lens 2, are shorter than first optical paths of beams L2 and L3 that are emitted from the light sources 12 and 13 disposed close to the optical axis Ax of the collimator lens 2, i.e., the distance from the light sources 12 and 13 to the collimator lens 2.

Specifically, in the emitting unit 110, the light sources 11 to 14 are aligned in the sub-scan direction on one surface of a body 120, e.g., in cuboid (referred to as a surface 121 herein later). The surface 121 of the body 120 is concave, for example. The light sources 11 and 14 formed on the surface 121 are arranged closer to the collimator lens 2, e.g., by the distance $\Delta L_0$ than the light sources 12 and 13 on the body 120. The distance $\Delta L_0$ correspond to the difference $\Delta q_s$ in the sagittal field tilt, e.g., magnitude of satittal field curvature, of the collimator lens 2 in the first embodiment and is 0.002 mm, for example.

Oppositely to the first embodiment, in this embodiment since 0.0044 mm of correction is required in the sub-scan direction, 0.002 mm of correction is not enough. However, by setting the radius of curvature of field of the cylindrical mirror or the position thereof appropriately, four beams are preferably converged on the surface to be scanned. When the distance $\Delta L_0$ is too large, too much correction is made, resulting in larger optical spot size on the surface to be scanned and thus preferable printing is difficult. Accordingly, the distance $\Delta L_0$ lies within the range in the following numerical formula (6).

$$0 < \Delta L_0 < 1.2 \times \Delta q_S \quad (6)$$

As described in the embodiment with regard to the beams L1 and L4 emitted from the respective light sources 11 and 14, which is disposed away from the optical axis Ax of the collimator lens 2, the distance from the light source to the collimator lens is made shorter. Accordingly, even though the collimator lens 2 has the curvature of field, positions of image formation with beams L1 to L4 are on the surface 91 to 94 to be scanned, the surfaces 91 to 94 being arranged on the same plane. Thus, variation in size and shape of the optical spot on the surface to be scanned is prevented.

Although the present invention has been described by exemplifying the embodiments, the present invention is not limited to the embodiments and various modifications are possible. For example, in the above described embodiment, a plurality of beams is led from the optical scanning apparatus onto the separate photoconductor drums but a plurality of beams may be led onto one photoconductor drum.

The present invention is not limited to the optical scanning apparatus having the configuration illustrated in FIGS. 1 to 3 and the present invention may be applicable to an optical scanning apparatus having a different configuration. The optical scanning apparatus of the invention is not only applied to the laser printer as in FIG. 6 but also to other image formation apparatus. Further, the optical scanning apparatus of the invention is not only applicable to the color image formation apparatus but also to a monochrome image formation apparatus. Alternatively, the optical scanning apparatus of the present invention may be applied to an image formation apparatus capable of printing a plurality of pages all at once.

As described above, according to the optical scanning apparatus of the invention, at least one of a first optical path of each beam and a second optical path of each beam is set in accordance with a curvature of field of the first optical system, the first optical path being from each of the light sources to the first optical system and the second optical path being from the deflecting means to the target surface. Therefore, even though the first optical system has the curvature of field, the image point formed with each beam is located just on the target surface to be scanned. Thus, even with the use of a moderately priced first optical system without high precision, each beam is precisely imaged on the target surface.

According to the optical scanning apparatus of one aspect of the invention, at least one of the first optical path and the second optical path is set in accordance with a curvature of field of the collimator. Therefore, even with the use of a moderately priced collimator lens without high precision, an image is precisely formed with each beam on the target surface.

According to the optical scanning apparatus of another aspect of the invention, the larger a distance between a light source and an optical axis of the first optical system is, the shorter at least one of the first optical path and the second optical path of the beams emitted from the light source is. Accordingly, even though the image point is deviated frontward or backward due to the curvature of field of the first optical system, the image point comes onto the target surface.

According to the optical scanning apparatus of still another aspect of the invention, the optical path along each beam from the deflecting means to the target surface is changed by means of changing a configuration of the second optical system.

According to the optical scanning apparatus of still another aspect of the invention, the optical path along each beam from the deflecting means to the target surface is changed by means of adjusting a position of the target surface.

According to the optical scanning apparatus of still another aspect of the invention, the second optical system has a common part through which all of the beams deflected by the deflecting means pass, the common part having a converging ability only in the scan direction. Thus, even though the second optical lens has the curvature of field, the optical spot size on the target surface or the like is not influenced by the curvature of field.

According to the optical scanning apparatus of still another aspect of the invention, the second optical system has a common part through which all of the beams deflected by the deflecting means pass, and center axes of the beams which pass through the common part are parallel to each other. Therefore, the second optical system evenly acts on each beam. Thus, scanning is evenly performed.

Obviously many modifications and variations of the present invention are possible in the light of the above teachings. It is therefore to be understood that within the scope of the appended claims the invention may be practiced otherwise than as specifically described.

What is claimed is:

1. An optical scanning apparatus for scanning a beam on a target surface to be scanned, comprising:

at least three light sources, each of which emits a beam;

a first optical system provided in common with the at least three beams emitted from the light sources;

deflecting means which deflects the beams passed through the first optical system in a manner that the beams are scanned on the target surface along a scan direction; and a second optical system which forms images on the target surface with the beams deflected by the deflecting means, wherein each of first optical paths of the beams is set in accordance with a curvature of field of the first optical system, each of second optical paths of the beams is set in accordance with the curvature of field of the first optical system, or each of the first optical paths and the second optical paths of the beams is set in accordance with the curvature of field of the first optical system, the first optical paths being from each of the light sources to the first optical system and the second optical paths being from the deflecting means to the target surface.

2. An optical scanning apparatus according to claim 1, wherein the first optical system includes a collimator for converting each of the beams into a parallel beam in substance, and at least one of the first optical path and the second optical path is set in accordance with a curvature of field of the collimator.

3. An optical scanning apparatus according to claim 2, wherein the first optical system further includes a convergent optical system which converges each of the beams, converted into the parallel beam in substance by the collimator, only in a direction corresponding to a direction orthogonal to the scan direction on the target surface, so that each of the beams is focused in the vicinity of the deflecting means.

4. An optical scanning apparatus according to claim 1, wherein the larger a distance between a light source and an optical axis of the first optical system is, the shorter at least one of the first optical path and the second optical path of the beams emitted from the light source is.

5. An optical scanning apparatus according to claim 1, wherein the optical path along each beam from the deflecting means to the target surface is changed by means of changing a configuration of the second optical system.

6. An optical scanning apparatus according to claim 1, wherein the optical path along each beam from the deflecting means to the target surface is changed by means of adjusting a position of the target surface.

7. An optical scanning apparatus according to claim 1, wherein the second optical system has a common part through which all of the beams deflected by the deflecting means pass, the common part having a converging ability only in the scan direction.

8. An optical scanning apparatus according to claim 1, wherein the second optical system has a common part through which all of the beams deflected by the deflecting means pass, and center axes of the beams which pass through the common part are parallel to each other.

9. An optical scanning apparatus according to claim 1, wherein the deflecting means is a rotary polygon mirror having a plurality of specular surfaces.

* * * * *

UNITED STATES PATENT AND TRADEMARK OFFICE
CERTIFICATE OF CORRECTION

PATENT NO.     : 6,559,998 B2
DATED          : May 6, 2003
INVENTOR(S)    : Hiromitsu Yamakawa It is certified that error appears in the above-identified patent and that said Letters Patent is hereby corrected as shown below:

<u>Title page,</u>
Please insert Item [73], Assignee as:
-- [73]   Assignee:   Fuji Photo Optical Co., Ltd. Omiya City, Saitama Japan --

Signed and Sealed this

Fifth Day of August, 2003

JAMES E. ROGAN
*Director of the United States Patent and Trademark Office*